United States Patent Office 2,998,835
Patented Sept. 5, 1961

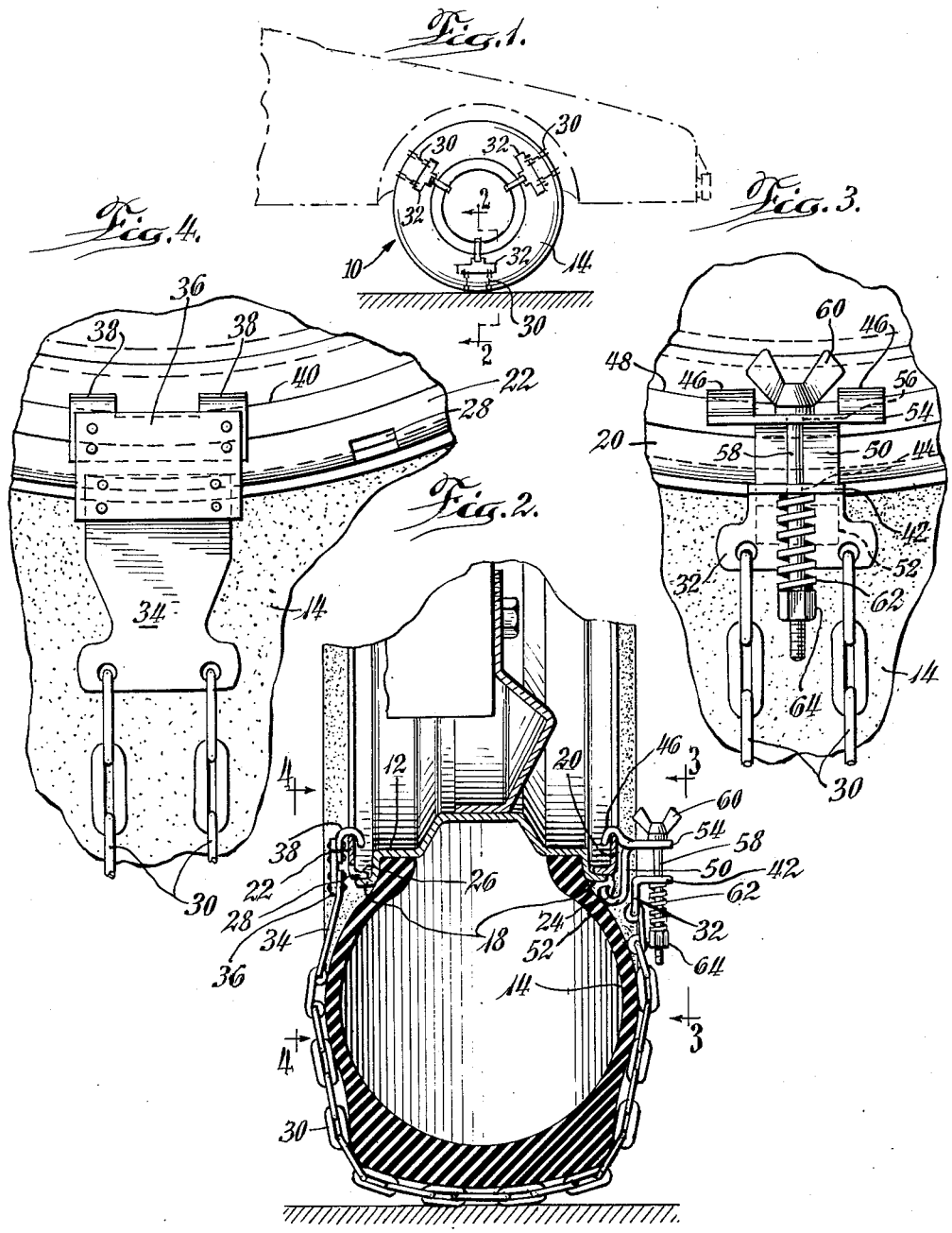

2,998,835
AUTOMOBILE TIRE CHAIN SET
Antonio Di Fonzo, 614 Meadow Road, Lombard, Ill.
Filed Sept. 9, 1960, Ser. No. 54,873
2 Claims. (Cl. 152—236)

The present invention relates to traction increasing tire chains for automobiles having pneumatic tires.

One of the objects of my invention is to provide a novel structure which makes the application and removal of tire chains quick and easy of accomplishment.

An additional object is to accomplish the above by providing a novel tire chain set as accessory equipment which can be used with standard automobile wheels, regardless of whether the wheel disc inside the rim portion is perforated or solid and regardless of the presence or absence of frequently used trim rings or discs.

A further object is to provide a novel skid chain set in which chain groups may be individually and quickly applied in any desired number and at any desired circumferential location about the wheel and tire and, once applied, will not become loose or fall off with continued running even if there is no subsequent adjustment.

Another object is to accomplish the above at low cost.

Other objects and advantages will become apparent from the following description of a preferred embodiment of my invention which is illustrated in the accompanying drawings.

In the drawings, in which similar characters of reference refer to similar elements throughout the several views:

FIG. 1 is a side view of an automobile wheel and surrounding body structure illustrating three chain sets according to this invention as they appear when applied;

FIG. 2 is an enlarged sectional view taken substantially in the direction of the arrows along the line 2—2 of FIG. 1 illustrating a chain set in elevation;

FIG. 3 is a fractional front view illustrating the clamping mechanism. It may be considered as taken in the direction of the arrows along the line 3—3 of FIG. 2; and FIG. 4 is a view similar to FIG. 3, but showing the mechanism at the back side of the wheel. It may be considered as taken in the direction of the arrows along the line 4—4 of FIG. 2.

Automobile tire chains have been used for many years and, for a long time, usually took the form of a pair of circumferential side chains which were fastened together end to end at the outer and inner sides of an automobile tire with crosslinks extending over the tread portion of the tire connecting the side chains. Such chains were difficult of application, particularly under road conditions, and the difficulty has in general greatly increased because of current trends toward automobile body structure which closely surrounds and partially encloses the wheels. A more recent and currently more popular approach is to provide the tire chains in individual sets. Each set usually comprises two cross chains, the sets being individually applicable. The present invention relates to tire chain sets of the latter type. It, however, overcomes many of the objections which have reduced the utility of such sets in the past.

Most tire chain sets of the type which are applied individually and separately to the wheel make use of a strap connected to one end of the cross chain which is inserted from inside to outside through an opening in the wheel disc, the end of this strap being secured to some sort of buckle at the other end of the chain so that the chain links pass over the tread of the tire. Many modern automobile wheels supplied as original equipment do not have any openings which can accommodate such a connecting strap, and chain sets of this type are therefore useless on such wheels.

An increasingly apparent additional disadvantage of strap connected tire chains is that the wheel must be maneuvered into such a position that one of the openings is accessible so that the strap can be passed therethrough. Currently manufactured automobile body structures usually so envelop the wheels that a rather precise positioning of the wheel is necessary in order to make these openings accessible, and this of course reduces the utility of this approach to the problem. Furthermore, the problem of reaching around behind the wheel far enough to thread the end of the strap in an outward direction through one of the wheel openings is almost certain to result in the operator getting mud or slush upon his clothes. Particularly is this true when it is appreciated that the brake structure usually almost completely obstructs the openings.

When chain sets embodying the present invention are used, it is convenient to apply the chains in individual sets to a wheel at any circumferential position, and it is a matter of indifference as to whether the wheel disc is perforated. There is the further advantage that the operation of applying or removing the chains may be accomplished very quickly without the operator getting dirty even under muddy difficult conditions. Also, once the chain sets have been applied to a wheel, they can remain in place for continued running for extended periods without periodic checking and adjustment which is usually necessary in order to insure that the chains remain tight and do not either become lost of fly out sufficiently to strike against some of the surrounding automobile body structure.

I have found by examination of substantially all types of automobile wheels in current use that although they vary in diameter, they nevertheless come in relatively few standard sizes, so that it is entirely practical to provide tire chain sets which are especially adapted to wheels of a particular size. As an example, automobile passenger cars usually are provided with 14" or 15" wheels excepting for older automobiles which may have 16" wheels. These three sizes, therefore, will accommodate almost all passenger cars. Although larger wheels are used upon commercial vehicles, investigation has disclosed that here also there is standardization among the wheel and tire manufacturers upon a relatively few wheel sizes.

I have also found that upon all wheels which I have examined the extreme outer edges of the rims are sharply rolled so as to extend straight outwardly to provide short cylindrical flanges as at 18. Wheels have this feature so as to insure a smooth finished surface where the wheel rim engages the tire side wall, but additional use of this feature is made by my invention, as will appear presently.

In the drawings, a wheel 10 having a standard rim 12 and tire 14 is temporarily supplied by me with a pair of front and back rings 20 and 22 which may be identical. These rings are made of steel of about the same gauge as the wheel and may be relatively narrow, of the order of ½ inch to an inch wide. They have the periphery rolled outwardly at right angles so as to form flanges as at 24 and 26. This outwardly turned portion is quite narrow, and may be no more than ⅛" or so. Each ring 20—22 has an external diameter across the flange 24—26 which provides an interference fit with the previously mentioned outwardly turned flange 18 at each edge of the wheel rim. The interference in the fit should be sufficient so that the rings 20—22 can be applied to the front and back of the vehicle wheel by engaging the edges at one point and then driving the ring into the wheel with a mallet or the like. After the rings have been driven into place, they become a permanent part of the automobile wheel for as long as is desired. At any time they may be easily removed with a screw driver or similar tool, a notch 28 being provided in each of these rings at one place at the periphery into which a screw driver blade may be inserted so as to pry the rings from the wheels.

For ordinary suburban or city use it is suggested that the rings 20—22 be applied to the driving wheels of the vehicle whenever it is anticipated that bad driving conditions may be encountered. This throughout the major portion of the United States indicates application of the rings in the fall and their removal in the late spring. They may, of course, be allowed to remain in place permanently, and such usage is suggested for farm or other country vehicles which may be called upon to operate under muddy or slippery conditions at almost any time of the year.

The removable chain sets are made up of a pair of cross chains 30 which are connected at their ends to front and back spreader plates 32 and 34. The rearward spreader plate 34 is secured at its outer edge to a length of semiflexible strapping 36, made of heavy rubberized cotton webbing for instance, which extends away from the spreader plate for a matter of a few inches or so, and at its end is secured as by riveting to a metal hook 38 which is shaped to engage the inner edge 40 of the ring 22.

At the front side of the tire, the spreader plate 32 has its end portion toward the center of the wheel bent outwardly to provide a bracket 42 having an opening 44 therethrough for the passage of a bolt. A separate strip of metal is cut and bent to provide a pair of spaced hooks 46 adapted to engage the inner edge 48 of the outside ring 20, the metal strip between these hooks being bent downwardly to provide a finger 50 having a smooth curved end 52 which bears against the tire side wall when the hooks 46 are properly engaged. An outwardly extending bracket portion 54 of the strip has a hole 56 formed therethrough in alignment with the hole 44.

The threaded end of a bolt 58 having a winged head 60 is passed through the holes 56 and 44 in an outwardly direction. Below the bracket 42, the bolt passes through a coil spring 62 and is threaded into a nut 64. By turning the head 60, therefore, the force of the spring 62 biasing the bracket plates 42 and 54 toward each other can be adjusted.

The device is used in the following manner. The rings 20 and 22 are forced into place, as previously described, so that they become integral parts of the wheel until their removal is desired. Thereafter, whenever additional traction is desired, the automobile is stopped with the wheels in any position. The operator then grasps the end of the relatively stiff strap 34, reaches around the tread of the tire and catches the inner edge 40 of rear ring 22 with the hook 38. Since the strap 34 acts as a handle extension for the hook 38, it is not necessary to reach very far back of the tire in order to perform this operation. This advantage, together with the fact that the hook 38 can catch the ring 22 in any circumferential location, ordinarily makes it unnecessary for the operator to bring his clothes in contact with the tire or automobile body structure.

After the hook 38 has been engaged, the chains 30 are brought around the tire tread and the hooks 46 are slipped over the edge 48 of the outside ring 20. The wing bolt 58 is then turned to draw the chains tight and to compress the spring 62, the finger 50—52 engaging the tire face and holding the bracket 54 against tilting.

Inasmuch as the spring 62 provides a resilient connection, any subsequent movement of the chains 30 over the tire face in a manner which would normally cause them to loosen simply results in the extra slack being taken up by the constant tendency of the spring to shorten the chains. The chains therefore remain tight without subsequent adjustment.

If more than one set of chains is to be mounted upon the wheel, the automobile engine is used to rotate the wheel about a half turn or third turn or so, after which an additional set is installed. Note that if the additional sets are not properly spaced, the wing bolt can be loosened and the chain set moved around the wheel without removing the hooks 38 and 46.

When it is desired to remove the chains, the wing bolt 58—60 is loosened and the hooks 46 disengaged. Some of the slack chain is then pushed over the tire tread, and ordinarily the hook 38 will loosen and fall off the ring 22, thus permitting removal of the chain set.

As previously explained, it is intended that the rings 20 and 22 be allowed to remain upon the wheel so that they will be available, but in the manner described, they may be pried off with a screw driver when it is anticipated that they will not be needed for an extended period.

Although I have explained and illustrated my invention in connection with a single concrete embodiment thereof, it will be appreciated that changes in the structure may be made without departing from the scope or spirit of the invention, and that the scope of the invention is to be measured by the scope of the following claims.

Having described my invention, what I claim as new and useful and desire to secure by Letters Patent is:

1. A skid chain set for use with automobile wheels having tires mounted upon rims that have an outwardly turned flange at each rim edge, said set comprising a pair of narrow rings each having an external diameter adapted to provide a tight fit with the internal diameter across each of said flanges and a smooth circular inner periphery, at least one anti-skid element comprising a chain adapted to extend across the tread of a tire on said wheel, means providing a hook adapted to engage the inner periphery of one of said rings at any position, means connecting said hook to one end of said chain, means providing a second hook adapted to engage the inner periphery of the other of said rings at a position opposite the first said position, means connecting said second hook to the other end of said chain, one of said connections including a resilient element, and one of said connections including means for adjusting the distance between said hooks.

2. A skid chain set for use with automobile wheels having tires mounted upon rims that have an outwardly turned flange at each rim edge, said set comprising a pair of narrow smooth rings each having an external edge surface adapted to provide a tight fit with the internal diameter across each of said flanges and a smooth circular inner periphery, at least one anti-skid element comprising a chain adapted to extend across the tread of a tire on said wheel, means providing a hook connected to one end of said chain and adapted at any position to hook over the inner periphery of one of said rings, means providing a second hook connected to the other end of said chain adapted at any position to hook over the inner periphery of the other of said rings, one of said connections between said hooks and said chain including a resilient element and means for changing the distance between said hooks, and the other of said connections between said hooks and said chain including a semiflexible member adapted to serve as a handle extension for the hook connected thereto.

References Cited in the file of this patent

UNITED STATES PATENTS

| | | |
|---|---|---|
| 1,995,758 | Stokke et al. | Mar. 26, 1935 |
| 2,014,151 | Stuller | Sept. 10, 1935 |
| 2,474,521 | Fogarty | June 28, 1949 |
| 2,898,966 | Machesney | Aug. 11, 1959 |